United States Patent
Gupta et al.

(10) Patent No.: US 11,300,310 B2
(45) Date of Patent: Apr. 12, 2022

(54) HVAC SYSTEM AND METHOD USING SMART AIR FLOW CONTROL

(71) Applicant: Alea Labs, Inc., Redwood City, CA (US)

(72) Inventors: Bhusan Gupta, Palo Alto, CA (US); Hamid Najafi, Los Altos Hills, CA (US); Hamid Farzaneh, Atherton, CA (US)

(73) Assignee: Alea Labs, Inc., Redwood City, CA (US)

( * ) Notice: Subject to any disclaimer, the term of this patent is extended or adjusted under 35 U.S.C. 154(b) by 0 days.

(21) Appl. No.: 16/291,687

(22) Filed: Mar. 4, 2019

(65) Prior Publication Data

US 2020/0284459 A1 Sep. 10, 2020

(51) Int. Cl.
| | |
|---|---|
| F24F 11/72 | (2018.01) |
| F24F 11/50 | (2018.01) |
| F24F 11/30 | (2018.01) |
| F24F 11/64 | (2018.01) |
| F24F 140/60 | (2018.01) |
| F24F 110/10 | (2018.01) |
| G05D 23/19 | (2006.01) |

(52) U.S. Cl.
CPC ............. *F24F 11/50* (2018.01); *F24F 11/30* (2018.01); *F24F 11/64* (2018.01); *F24F 11/72* (2018.01); *F24F 2110/10* (2018.01); *F24F 2140/60* (2018.01); *G05D 23/1917* (2013.01); *G05D 23/1951* (2013.01)

(58) Field of Classification Search
CPC .. F24F 11/50; F24F 11/64; F24F 11/72; F24F 11/80
See application file for complete search history.

(56) References Cited

U.S. PATENT DOCUMENTS

| | | | |
|---|---|---|---|
| 2009/0078781 A1* | 3/2009 | Kanemaru | B60H 1/00742 236/49.3 |
| 2011/0031322 A1* | 2/2011 | Zou | F24F 11/30 236/1 B |
| 2014/0222241 A1* | 8/2014 | Ols | G05B 15/02 700/299 |
| 2015/0066222 A1* | 3/2015 | Martinez | F24F 3/0442 700/277 |
| 2016/0047565 A1* | 2/2016 | Robinson | H04L 12/2803 700/278 |
| 2016/0259351 A1* | 9/2016 | Barrett | F24F 3/044 |
| 2017/0023269 A1* | 1/2017 | Gevelber | F24F 11/62 |
| 2017/0250539 A1* | 8/2017 | Feng | H02J 13/0075 |
| 2017/0299218 A1* | 10/2017 | Kojima | F24F 11/76 |
| 2017/0314800 A1* | 11/2017 | Bengea | G05B 13/04 |
| 2018/0058741 A1* | 3/2018 | Boehde | F04D 27/004 |
| 2018/0373278 A1* | 12/2018 | Walser | G05D 23/1927 |
| 2019/0376707 A1* | 12/2019 | Emmons | F24F 13/1413 |

* cited by examiner

*Primary Examiner* — Mohammad Ali
*Assistant Examiner* — Vincent W Chang
(74) *Attorney, Agent, or Firm* — Schwegman Lundberg & Woessner, P.A.

(57) ABSTRACT

A method for conditioning at least one room comprises receiving a first temperature target for a first room; determining a current temperature of the room; determining a first amount of forced air required to reach the temperature target based on a thermal inertia of the first room and the current temperature; powering on an HVAC blower; and powering off the blower once the determined first amount of forced air is blown.

14 Claims, 6 Drawing Sheets

HVAC SYSTEM AND METHOD USING SMART AIR FLOW CONTROL

TECHNICAL FIELD

An embodiment of the present subject matter relates generally to HVAC systems and, more specifically, to a HVAC with smart forced air flow based on the specific thermal characteristics of the rooms to be conditioned.

BACKGROUND

A vast majority of residences and offices in the U.S. and other countries use a "Forced Air" system for heating and cooling the interior of the building. In these systems, there is normally a single thermostat in one location and there are registers or vents in each room for the air to flow through. This thermostat provides the sole point of control for the whole building temperature control.

If the door to a room is partially or completely closed or if the room is remote from the thermostat or the air generation location, the temperature in the room can differ significantly as compared to the temperature measured by the thermostat. Typical thermostats are located close to the air return register which allows for measuring an average temperature of the air flowing back into the system to get conditioned. Individual room temperatures can be either too low or too high relative to the target temperature depending on many variables like the size of the room, the size of the house, the location or orientation of the room, time of the year, construction of the HVAC system, etc.

Also, no support exists for setting different temperature setpoints in each room for the occupants. For instance, parents might want to keep the children's bedroom(s) warmer than the master bedroom when the HVAC system is being used to heat the house. Conversely, the room might need to be cooler than other rooms when the HVAC system is being used to cool the house. Or some rooms may not need to be heated or cooled at all when vacant either temporarily or permanently.

Further, a fan that controls the amount of air sent through the ducts from the HVAC system is normally a single speed fan. The fan controller does not possess any information about the amount of air that the house collectively needs, at specific times, to maintain the proper temperature throughout the house. The fan is either turned on or turned off based on the signal sent to the HVAC control system by the main thermostat in the house. Therefore, the airflow sent by the HVAC system via its control system and algorithm is the same whether the entire house needs conditioned air to reach its localized desired temperature versus if only one or a handful of rooms need the air to reach its desired temperature. Furthermore, the remainder of the system (heat exchangers, compressors) is also likewise limited to a binary operation (on or off) due to a lack of information about the demand of conditioned air.

Accordingly, the lack of individual control for each room and the lack of fan speed control makes the conventional system very inefficient both in terms of individual comfort and energy savings. Many unoccupied rooms are still provided with the full complement of conditioned air because the system produces that amount of air and no less, no more.

Accordingly, improvements are needed.

SUMMARY

In an embodiment, a method comprises: receiving a first temperature target for a first room; determining a current temperature of the room; determining the first amount of time until the target temperature is to change; determining a first amount of forced air required to reach the temperature target based on a thermal inertia model of the first room and the current temperature; powering on an HVAC blower and heating or cooling apparatus; and powering off the blower and heating and cooling apparatus once the determined first amount of forced air is blown.

In an embodiment, the method further comprises: determining a second thermal inertia and second current temperature of a second room; determining the second amount of time until the target temperature is to change; receiving a second temperature target for the second room; determining a second amount of forced air required to reach the temperature target based on the second thermal inertia and second temperature; and adding the second amount to the first amount.

In an embodiment, the first and second temperature targets are different.

In an embodiment, the method further comprises: opening a first vent in the first room; opening a second vent in the second room; closing the first vent in the first room once the amount of forced conditioned air required to reach the first temperature target is blown into the first room by monitoring the temperature in the first room; closing the second vent in the second room once the amount of forced conditioned air required to reach the second temperature target is blown into the second room by monitoring the temperature in the second room.

In an embodiment, the method further comprises determining a thermal inertia of a room as a function of time of day and season.

In an embodiment, the blower is variable speed and the powering on of the HVAC system sets the blower to a lowest speed setting.

In an embodiment, the method further comprises setting a blower speed of the HVAC blower to a level determined to minimize energy consumption or the time it takes to reach the desired room temperature or to optimize both parameters simultaneously.

In an embodiment, the method further comprises determining if the first room is unoccupied and closing a first vent in the first room if the first room is unoccupied.

In an embodiment, a non-transitory computer-readable medium storing instructions that, when executed by one or more computer processors of a gateway, cause the gateway to perform operations described above.

In an embodiment, a gateway, comprises: one or more processors; and one or more computer-readable mediums storing instructions that, when executed by the one or more computer processors, cause the gateway to perform operations described above.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Figure 1:
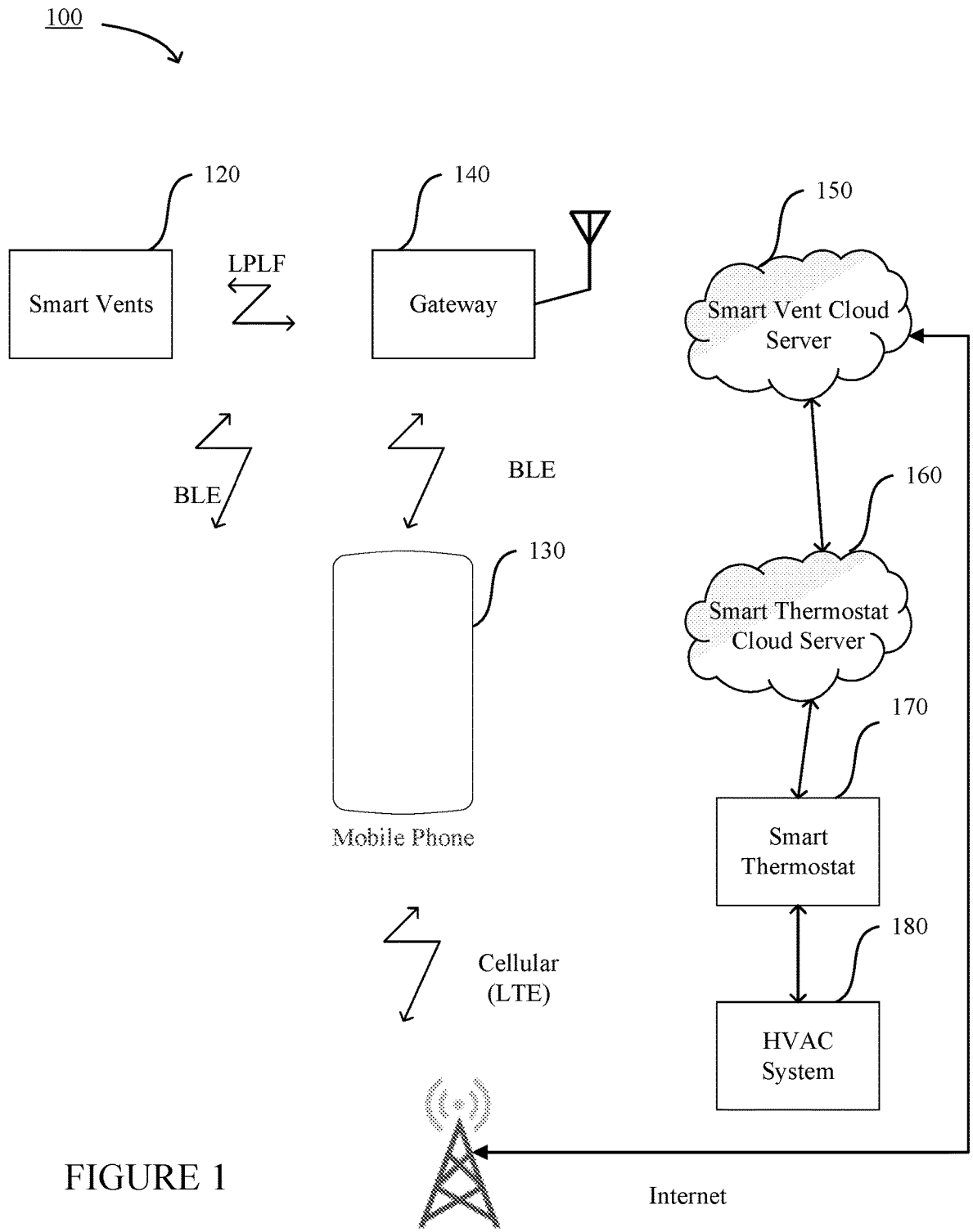
FIG. 1 is a block diagram of an example system including a smart thermostat.

FIG. 1 block diagram of an example system 100 including a smart thermostat 170. As shown, multiple devices (i.e., smart vent(s) 120, mobile phone or other handheld device 130, gateway 140, smart vent cloud server 150, smart thermostat cloud server 160, smart thermostat 170 and HVAC system 180) are communicatively connected to each other wirelessly or wired. The multiple devices can be located in a single room or building and/or multiple rooms/buildings. For example, one or more smart vents 120 can be included in one or more rooms. The HVAC air handler system 180 can be located either internally or externally to a building, e.g., on a rooftop of the building. The gateway 140 and the thermostat 170 may be located in a room or passageway of the building.

The servers 150 and 160 may be located at a cloud service provider. While cloud servers 150 and 160 are shown as separate entities, in an embodiment, the cloud servers can be combined into a single server and/or be located locally instead of in a cloud. The devices can be connected directly and/or via any type of network, including a local area network ("LAN"), such as an intranet, a wide area network ("WAN"), such as the internet or cellular network, or any combination thereof. Further, the network may be a public network, a private network, or a combination thereof. The network is implemented using any number of communications links associated with one or more service providers, including one or more wired communication links, one or more wireless communication links, or any combination thereof. Additionally, the network is configured to support the transmission of data formatted using any number of protocols.

Multiple computing devices can be connected to the network. A computing device is any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of the machine 700 shown in FIG. 7.

To facilitate communication with other computing devices, a computing device includes a communication interface configured to receive a communication, such as a request, data, etc., from another computing device in network communication with the computing device and pass the communication along to an appropriate component running on the computing device. The communication interface also sends a communication to another computing device in network communication with the computing device.

The cloud server 150 communicates with the smart thermostat 170 through the smart thermostat cloud server 160 using an API defined by the smart thermostat cloud server 160. The smart vent can therefore request from the smart thermostat to turn the HVAC system 180 on or off depending on whether the desired room temperature is achieved for all rooms equipped by smart vents.

During operation of the system 100, the mobile phone or other device 130 (e.g., laptop, PDA, smartwatch, etc.) can transmit/receive data to/from directly the Smart Vents 120, the Smart Vent Cloud Server 150 or the gateway 140 to set temperature in rooms where smart vents 120 are located. Temperature can be set for the whole building or different temperatures in different rooms as desired/needed. The smart vent cloud server 150 communicates with the Gateway 140 or Mobile phone 130 to collect data provided by Smart vents, and to send and receive commands to/from the smart vents. It communicates with Smart Thermostat Cloud Server 160 to send requests to the smart thermostat to, for instance, turn on/off the HVAC system or collect data provided by the Smart Thermostat. The smart thermostat server 160 and Smart Vent Cloud server act as the communication link between Smart Vents 120 and thermostat 170. Thermostat 170 provides control of the HVAC system 180 to turn it on or off when certain conditions programmed by the user or provided by the Smart Thermostat Cloud Server are met. The smart vents 120 will be discussed in more detail in conjunction with FIG. 3.

In an embodiment, the gateway 140, as will be discussed further below, communicates with the Smart Vents 120 and the Smart Vent Cloud server 150 and can determine thermal inertia in one or more rooms where smart vents 120 are located, can determine the current temperature(s), can determine the amount of forced air required to achieve desired temperatures, can turn on the HVAC system 180 at a low speed determined to minimize energy consumption, e.g., at a lowest or second lowest setting in a multi-speed fan (e.g., to generate just 300 cfm), can open or close smart vents 120 over time as desired temperatures are achieved, and can turn off the HVAC system 180. Many of the functions described for the gateway 140 can also be carried out in the smart vent cloud server 150. In many cases the two devices (140 and 150) are interchangeable. Alternatively, the gateway 140 can turn on the HVAC system 180 at a high speed determined to minimize a time it takes to reach a desired room temperature (e.g., high speed in a variable-speed fan).

In an embodiment, wireless communication between the smart phone 130 and the vent 120 is via low energy Bluetooth (BLE) and the wireless communications between the gateway 140 and the vent 120 is a low power lower frequency radio protocol, utilizing, for example, the 915 MHz ISM band that has better penetration through walls and windows and thus provides a longer range of useable radio link than BLE. However, any wired and/or wireless systems can be used.

Figure 2:
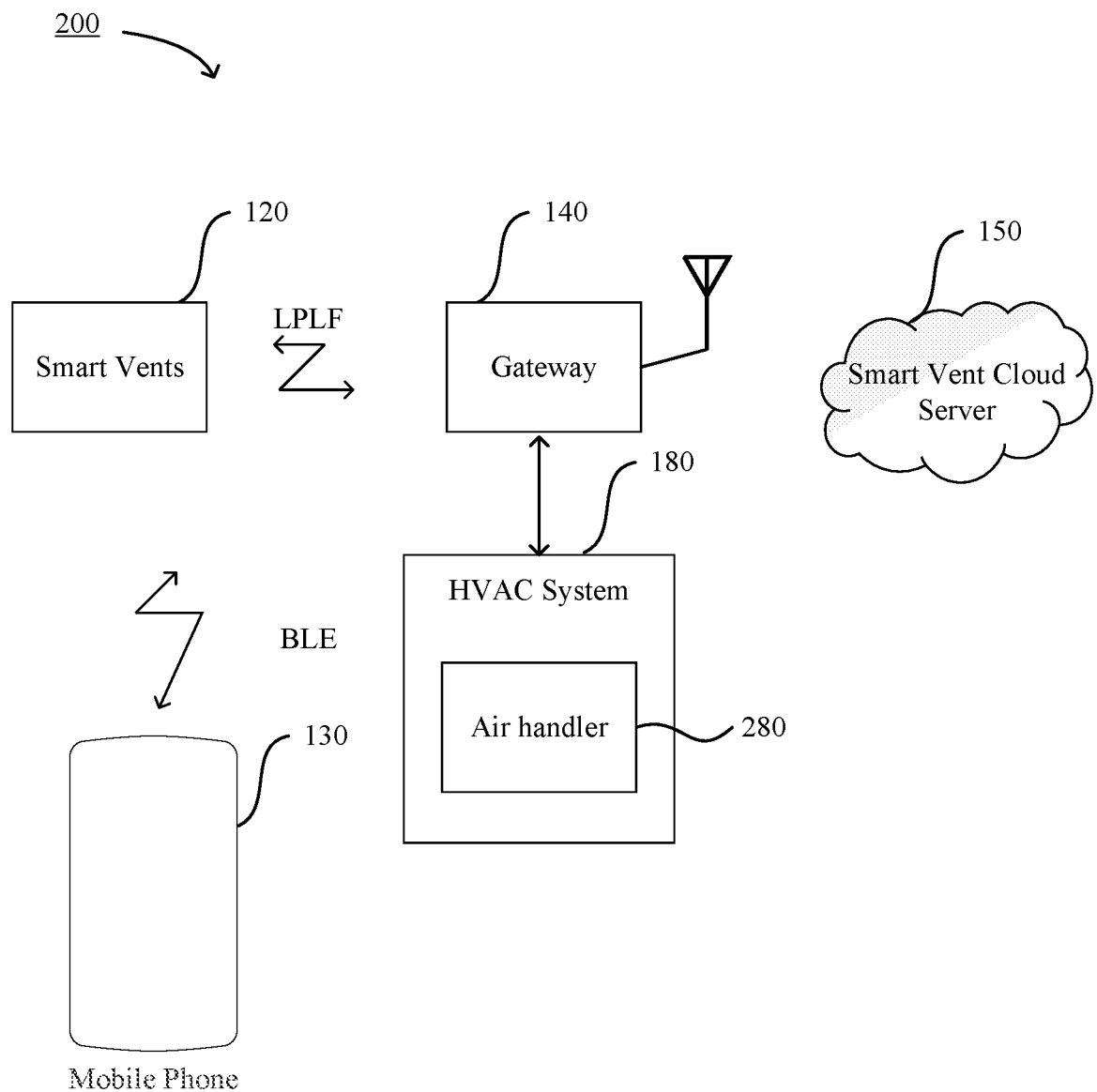
FIG. 2 is a block diagram of an example system including a gateway in place of the smart thermostat.

FIG. 2 is a block diagram of an example system including a gateway in place of the smart thermostat. In this embodiment, gateway 140 communicates directly with the HVAC system bypassing the smart thermostat 170 and its associated cloud server 160. In an embodiment, the HVAC system 180 includes an air handler 280 that includes a variable-speed fan (or blower), heating system (e.g., heat exchanger or heating element), and an optional cooling device. The cooling device comprises coils, compressor, evaporator/condenser, etc. The heating system may comprise a heat exchanger and a fuel source.

In another embodiment, a vent 120 can be placed in multiple rooms and each send the temperature in each room wirelessly to a gateway 140 which connects to the HVAC system 180 directly. Once the gateway detects that ALL rooms have reached their desired temperature, it will shut off the fan (blower) in the HVAC system 180 and wait for a smart vent 120 to report a decrease in temperature enough to turn on the heat again (or conversely a rise in temperature to turn on the air conditioner).

Figures 3, 4:
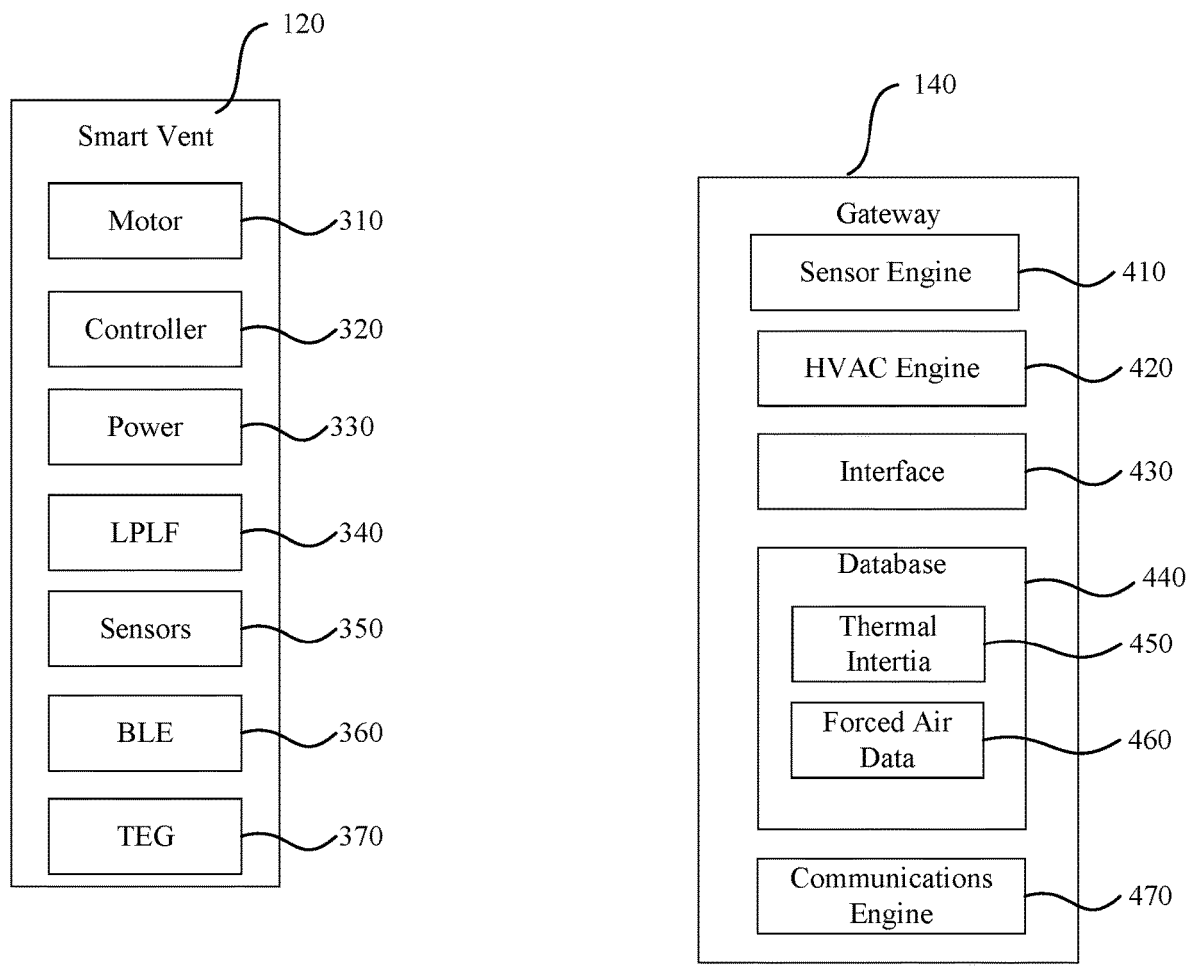
FIG. 3 is a block diagram of an example smart vent.
FIG. 4 is a block diagram of an example gateway.

FIG. 3 is a block diagram of a smart vent, according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the smart vent 120 to facilitate additional functionality that is not specifically described herein. Furthermore, the various functional components depicted in FIG. 3 may reside on a single computing device or may be distributed across several computing devices in various arrangements such as those used in cloud-based architectures.

The smart vent 120 comprises a motor 310, controller 320, power 330, wireless or wired communication module (s) such as a low power low frequency module 340, sensor (s) 350, a BLE radio 360 and Thermoelectric Electric Generator (TEG) 370. During operation, the controller 320 causes the sensors 350 take temperature and other relevant measurements and then transmits the measurements to the gateway 140. Based on the temperature and other measurements as will be described in more detail below, the controller 320 causes the motor 310 to open/close the vent 120. Power to the smart vent is supplied by power 330, which can include a thermoelectric generator, rechargeable and/or primary battery, and/or wired electricity, etc. In one embodiment, the vent 120 communicates via BLE 360 with the smart phone 130 or similar device for short range communication and connects with the gateway 140, which can be a further distance away, via the LPLF radio. In another embodiment, the smart vents are using a "mesh" networking method of communication to transfer data between the vents and the Gateway if the Gateway is too far from any of the vents to communicate reliably with the vents. The vent 120 receives a wireless command from the gateway 140 or the smart phone 130 to open a vent so that air flows from the duct to the room.

The sensors 350 can include a temperature sensor, such as a thermometer or infrared sensor to measure temperature. The sensors 350 can also include other sensors in place of or in addition to the temperature sensor. This includes a humidity sensor to measure room air humidity and report this information to the gateway 140, a cloud or smart phone or other smart device. Another sensor is a pressure sensor that measures air pressure near the vent, inside the duct and reports this to the gateway 140, another smart device, such as a smart thermostat to stop the flow of air or to open the vent to prevent air pressure build up in the ducts that can be detrimental to reliable and efficient operation of the HVAC system (for example, when a predetermined pressure threshold such as 0.5 inches of water column is exceeded).

In an embodiment, the vent 120 is equipped with an acoustic sensor such as a microphone and detects if a whistling sound is generated by the vent as the air flows through its louvers, especially when the louvers are almost, but not fully, closed. The presence of whistling sound is reported to the controller 320 and/or the gateway 140. The vent louvers may then be adjust by the motor directed either by the controller 320 or by the gateway 140 to change position to eliminate the unpleasant whistling sound.

In another embodiment, the vent 120 is equipped with an air quality sensor to detect the level or type of pollutants in the air and to alert the users if the air quality is not satisfactory. The air quality is measured and reported either on a real time basis or on a periodic basis. To further enhance this feature, the air quality can be tracked over a time period and then reported in a cumulative way alerting or informing the users of their long term exposure to air pollutants and indicating the need for a filter replacement.

In an embodiment, the vent 120 includes presence sensors that can detect if a room is occupied. The presence sensor can be infrared sensors scanning the entire room periodically or they could use other suitable sensor technologies. The presence sensor can be embedded in each vent or be a separate device communicating wirelessly with the gateway 140 and then close the vent 120 if no one is present.

The power 330 can include a power management circuit that converts and conditions voltage to a DC level. The DC level is applied to a power storage, such as a rechargeable battery or high capacity capacitor for storage of electric energy to drive all the circuits of the smart vent 120. The power management circuit also reads the battery/capacitor voltage for managing the power consumption of the circuits. The power management unit can also interface to the TEG 370 in order to effectively convert the energy generated by that unit into stored energy in the secondary batteries.

In order to save battery power, the controller 320 communicates with the Gateway 130 via the LPLF radio 340 on a fixed schedule to get updates and transfer sensor and other information. In one embodiment, this time schedule is once every 10 minutes. This time period is acceptable as the sensor data does not change rapidly and reaction to the sensor data changes does not need to be very fast. However, in cases, where the user is trying to interact with the vent, either via BLE directly commanding the vent or via commands to the gateway, the reaction has to be faster than 10 minutes so the user sees almost immediate results and reaction to his/her commands. In this case, the controller 320 can decide to override the 10-minute schedule and talk to the gateway immediately upon receiving commands from the user. This will not adversely affect the power consumption of the vent since this happens very infrequently and the normal operation of the vent 10-minute scheduling resumes after each user communication that requires urgent response. The schedule can also be lengthened when the available battery energy is low.

FIG. 4 is a block diagram of an example gateway 140. The gateway 140 comprises a sensor engine 410, an HVAC engine 420, an interface 430, a database 440, a communications engine 470. In addition, the gateway 140 can include sensors (not shown) substantially similar to the sensors 350. Any of these functional blocks can also exist in a substantially similar form in the smart vent cloud server 150, particularly the sensor engine 410, an HVAC engine 420, and a database 440.

The sensor engine 410 determines thermal inertia in rooms where the smart vent(s) 120 are installed. That is, how much forced air is needed to achieve a certain ΔT. The amount of forced air/room may not be fixed and may vary by time of day, season, room doors open/closed, distance from the air handler 280 (due to energy loss over distance), size of the smart vents 120, sun/wind exposure and other factors. All of this data can be stored in the database 440 in thermal inertia data 450 for rooms with installed vents 120. The sensor engine 410 also measures current temperature in each room with vents 120 and sums the amount of forced air/room needed to achieve a desired temperature as input via interface 430 (directly into the gateway 140, which can include a smart device (e.g., smart speaker like Alexa), a tablet, mobile device, etc. or input via mobile device 130). The sum of forced air is stored in forced air data 460 as is updated as forced air in blown into the system 100 or 200.

The HVAC engine 420 commands the smart vents 120 to open/close (or partially open/close) based on the forced air calculations made by the sensor engine 410 and turns on the air handler 280 at a low speed as mentioned above or at a speed to minimize the time it takes to achieve the desired temperature in each room or at a speed determined to minimize energy consumption. Using a low speed setting may increase amount of time needed to reach a desired temperature but is more cost and energy efficient as the HVAC system 180 will not need to repeatedly cycle on and off. This may also ensure people's comfort and repeatedly cycling on and off may affect people's sleep or attention. Once the amount forced air needed has been blown into the system 100 or 200 as indicated by the forced air data 460, the HVAC engine 420 turns off the air handler 280. In an embodiment, the engine 420 can adjust speed of the blower, and therefore volume of conditioned air/time based on parameters including the number of rooms, the number of open vents, the distance between the blower and each room, the difference between the current and the desired temperatures in each room, humidity, the size of each room, size of vents, and how may vents exist in each room.

The interface 430 provides an interface on the gateway 140 itself (e.g., a graphical user interface) and/or on the mobile phone 130 to that a user can enter a desired temperature for a building as a whole or different desired temperatures in each room with a smart vent installed.

The communications engine 470 sends and receives data from the devices in system 100 and 200 using various wired and wireless protocols as needed.

Figure 5:
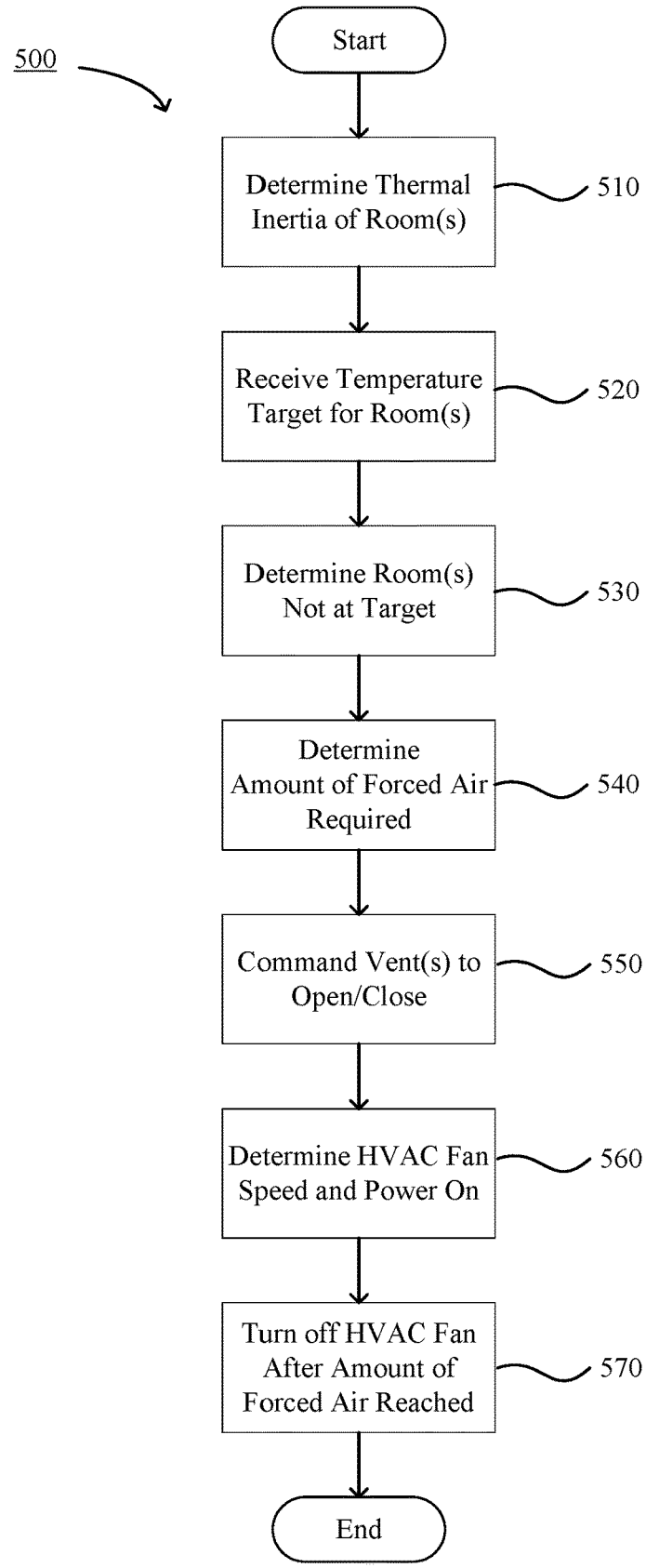
FIG. 5 is a flowchart of an example method for forced air calculations and room conditioning.

FIG. 5 is a flowchart of an example method 500 for forced air calculations and room conditioning. Initially, the sensor engine 410 determines (510) a thermal inertia of a room or rooms over time and stores this thermal inertia data in the database 440. Thermal inertia of a room will vary based on many factors including time of day and Next, the interface 430 receives (520) a temperature target(s) for a room or rooms. The targets can be different for different rooms and over time. The interface 430 can receive (520) the targets via an input device on the gateway 140 itself, which can include a tablet or other device. The input may include voice input, touch input, and/or motion input, etc. Alternatively, a use can enter targets on the mobile device 130 (e.g., mobile phone, tablet, laptop, etc.), which then transmits the targets to the gateway 140 via the communications engine 470.

The sensor engine 410 then determines (530) rooms not at targets and amount of forced air (cooled or heated) required to get each room to the target and sums the amount. The HVAC engine 420 commands (550) smart vents 120 to open/close based on the forced air calculations made by the sensor engine 410 and commands (560) the air handler 280 on at a low speed as mentioned previously. Once targets are reached at rooms, the engine 420 can command the relevant vents 120 to close. Note that targets may not be reached in all rooms simultaneously. Further target temperature can be determined by the sensor engine 410 based on actual temperatures measured in rooms and/or calculating amount of forced air sent into the room versus amount of forced air previously calculated. Once the sum of calculated forced air is reached, the HVAC engine 320 turns off (570) the HVAC fan. The method 500 then ends.

In an embodiment, the method 500 can further comprise dynamically adjusting the opening of the vent 120 and amount of conditioned air to a given room based on the desired temperature set for each room so as to minimize the time it would take to get all the rooms to the desired temperature. For example, an unoccupied room's vent with be fully closed, a room that requires less conditioned air to reach its target temperature would start partially open and all rooms' vents would gradually close as they approach the target temperature, the end result being that all rooms would reach their respective target temperature at about the same time.

Software Architecture

Figure 6:
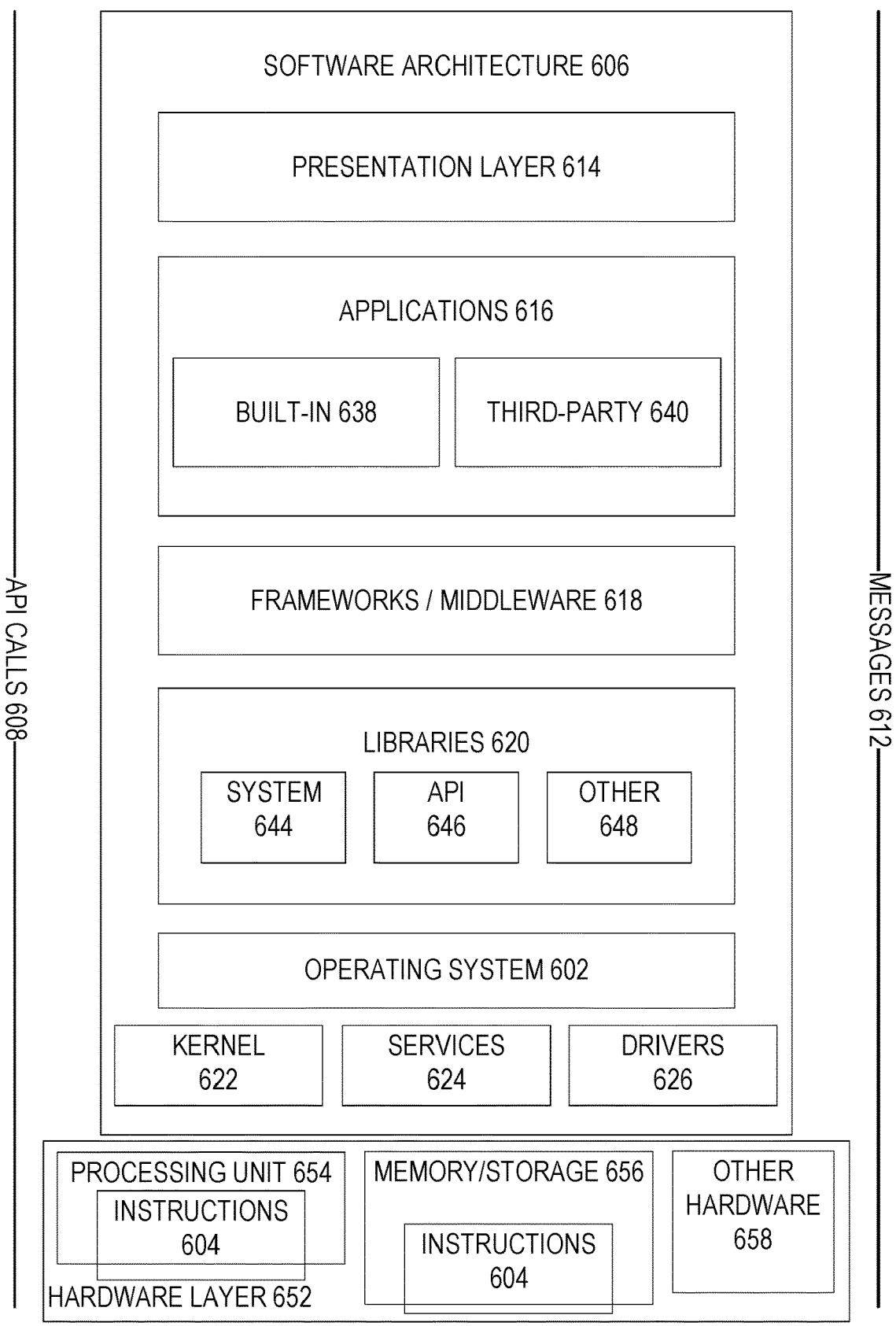
FIG. 6 is a block diagram illustrating a representative software architecture, which may be used in conjunction with various hardware architectures herein described.

FIG. 6 is a block diagram illustrating an example software architecture 406, which may be used in conjunction with various hardware architectures herein described. FIG. 6 is a non-limiting example of a software architecture 606 and it will be appreciated that many other architectures may be implemented to facilitate the functionality described herein. The software architecture 606 may execute on hardware such as machine 700 of FIG. 7 that includes, among other things, processors 704, memory 714, and (input/output) I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components, and so forth described herein. The hardware layer 652 also includes memory and/or storage modules memory/storage 656, which also have executable instructions 604. The hardware layer 652 may also comprise other hardware 658.

In the example architecture of FIG. 6, the software architecture 606 may be conceptualized as a stack of layers where each layer provides particular functionality. For example, the software architecture 606 may include layers such as an operating system 602, libraries 620, frameworks/middleware 618, applications 616, and a presentation layer 614. Operationally, the applications 616 and/or other components within the layers may invoke API calls 608 through the software stack and receive a response such as messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624 and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphic user interface (GUI) functions, high-level resource management, high-level location services, and so forth. The frameworks/middleware 618 may provide a broad spectrum of other APIs that may be used by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624 and/or drivers 626), libraries 620, and frameworks/middleware 618 to create user interfaces to interact with users of the system. Alternatively, or additionally, in some systems, interactions with a user may occur through a presentation layer, such as presentation layer 614. In these systems, the application/component "logic" can be separated from the aspects of the application/component that interact with a user.

Figure 7:
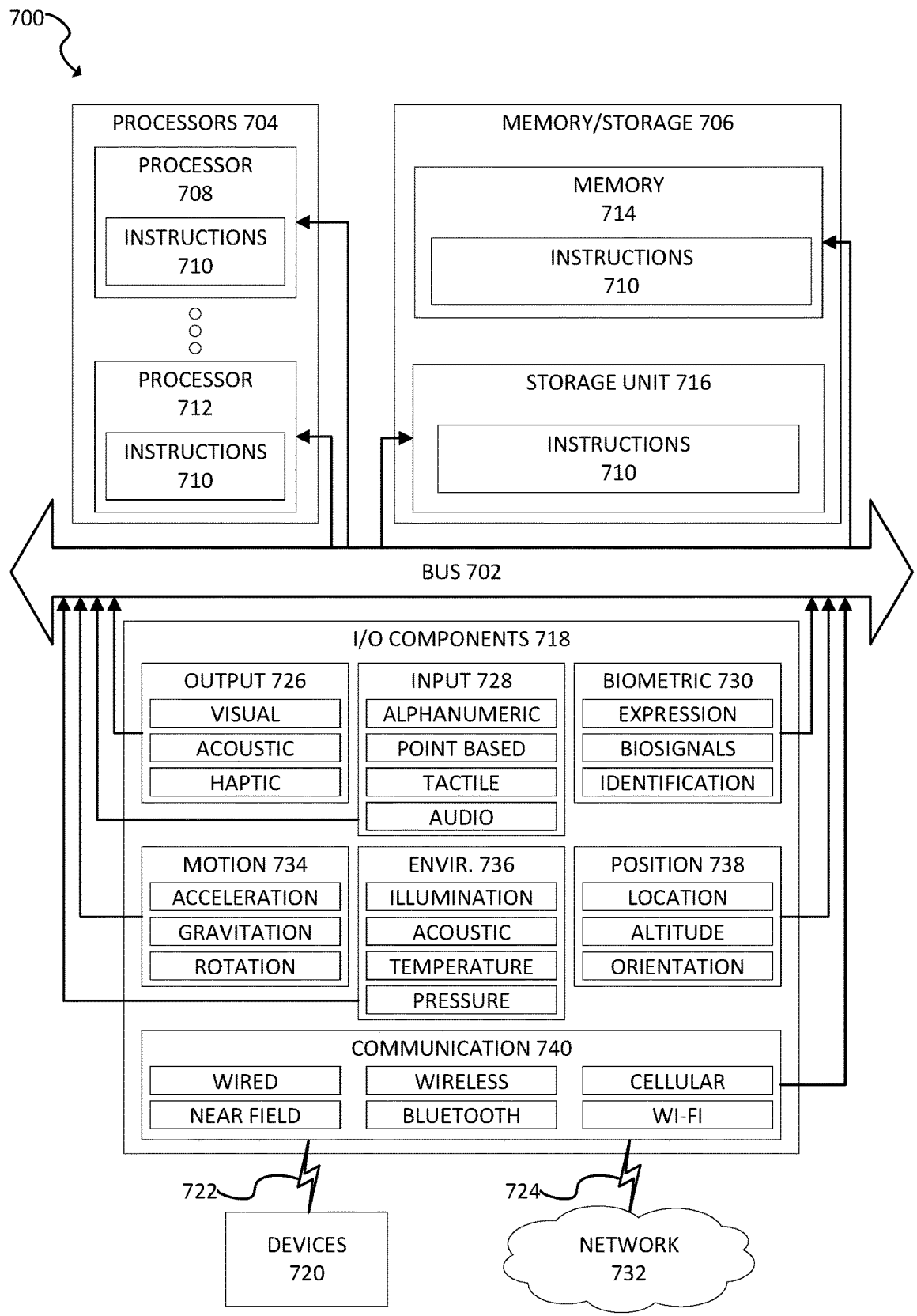
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions 604 from a machine-readable medium (e.g., a machine-readable storage medium) and perform any one or more of the methodologies discussed herein. The smart vent 120, the smart phone 130 and the gateway 130 can be implemented as machine 700. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 700 capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 730, motion components 734, environmental components 736, or position components 738 among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environmental components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via coupling 724 and coupling 722, respectively. For example, the communication components 740 may include a network interface component or other suitable device to interface with the network 732. In further examples, communication components 740 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a USB).

Moreover, the communication components 740 may detect identifiers or include components operable to detect identifiers. For example, the communication components 740 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 710 for execution by the machine 700, and includes digital or analog communications signals or other intangible medium to facilitate communication of such instructions 710. Instructions 710 may be transmitted or received over the network 732 using a transmission medium via a network interface device and using any one of a number of well-known transfer protocols.

"CLIENT DEVICE" in this context refers to any machine 700 that interfaces to a communications network 732 to obtain resources from one or more server systems or other client devices. A client device 130 may be, but is not limited to, a mobile phone, desktop computer, laptop, PDAs, smart phones, tablets, ultra books, netbooks, laptops, multi-processor systems, microprocessor-based or programmable consumer electronics, game consoles, STBs, or any other communication device that a user may use to access a network 732.

"COMMUNICATIONS NETWORK" in this context refers to one or more portions of a network 732 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 732 or a portion of a network 732 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 710 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 710. The term "machine-readable medium" shall also be taken to include any medium, or combination of multiple media, that is capable of storing instructions 710 (e.g., code) for execution by a machine 700, such that the instructions 710, when executed by one or more processors 704 of the machine 700, cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 704) may be configured by software (e.g., an application 616 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 704 or other programmable processor 704. Once configured by such software, hardware components become specific machines 700 (or specific components of a machine 700) uniquely tailored to perform the configured functions and are no longer general-purpose processors 704. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 704 configured by software to become a special-purpose processor, the general-purpose processor 704 may be configured as respectively different special-purpose processors (e.g., comprising different hardware components) at different times. Software accordingly configures a particular processor or processors 704, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 702) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 704 that are temporarily configured (e.g., by software) or permanently configured to perform the relevant operations. Whether temporarily or permanently configured, such processors 704 may constitute processor-implemented components that operate to perform one or more operations or functions described herein. As used herein, "processor-implemented component" refers to a hardware component implemented using one or more processors 704. Similarly, the methods described herein may be at least partially processor-implemented, with a particular processor or processors 704 being an example of hardware. For example, at least some of the operations of a method may be performed by one or more processors 704 or processor-implemented components. Moreover, the one or more processors 704 may also operate to support performance of the relevant operations in a "cloud computing" environment or as a "software as a service" (SaaS). For example, at least some of the operations may be performed by a group of computers (as examples of machines 700 including processors 704), with these operations being accessible via a network 732 (e.g., the Internet) and via one or more appropriate interfaces (e.g., an API). The performance of certain of the operations may be distributed among the processors 704, not only residing within a single machine 700, but deployed across a number of machines 700. In some example embodiments, the processors 704 or processor-implemented components may be located in a single geographic location (e.g., within a home environment, an office environment, or a server farm). In other example embodiments, the processors 704 or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine 700. A processor 704 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor may further be a multi-core processor having two or more independent processors 704 (sometimes referred to as "cores") that may execute instructions 710 contemporaneously.

What is claimed is:

1. A method, comprising:
    receiving a first temperature target for a first room;
    determining a first current temperature of the first room;
    determining a first thermal inertia of the first room as a function of time of day, season, distance between the first room and an HVAC air handler, and size of a first vent in the first room;
    determining a first volume of forced air of a fixed temperature required to reach the first temperature target based on the first thermal inertia of the first room and the first current temperature;
    powering on the HVAC air handler;
    determining a second thermal inertia and second current temperature of a second room;
    determining the second thermal inertia as a function of time of day, season, distance between the second room and the HVAC air handler, and size of a second vent in the second room;
    receiving a second temperature target for the second room;
    determining a second volume of forced air required to reach the second temperature target based on the second thermal inertia and second current temperature;
    adding the second volume to the first volume;
    opening the first vent in the first room;
    opening the second vent in the second room;
    closing the first vent in the first room once the volume of forced air required to reach the first temperature target is blown into the first room;
    sensing, with an acoustic sensor, a whistling sound as the first volume flows through the first vent or the second volume flows through the second vent; and
    adjusting louvers of the first vent or the second vent in response to the sensing.

2. The method of claim 1, wherein the first and second temperature targets are different.

3. The method of claim 1, wherein the HVAC air handler comprises a multi-speed blower and the powering on the HVAC air handler sets the blower to a lowest speed setting.

4. The method of claim 1, wherein the HVAC air handler comprises a multi-speed blower, heat exchanger and compressor, and the method further comprises:
    setting a blower speed of the HVAC air handler to a level determined to minimize energy consumption; and
    adjusting the heat exchanger and the compressor in the HVAC air handler to vary heat or cooling to prevent damage to the HVAC air handler.

5. The method of claim 1, further comprising setting a blower speed of the HVAC air handler to a level determined to minimize a time it takes to reach a desired room temperature.

6. The method of claim 1, further comprising determining if the first room is unoccupied and closing the first vent in the first room if the first room is unoccupied.

7. A non-transitory computer-readable medium storing instructions that, when executed by one or more computer processors of a gateway, cause the gateway to perform operations comprising:
    receiving a first temperature target for a first room;
    determining a first current temperature of the first room;
    determining a first thermal inertia of the first room as a function of time of day, season, distance between the first room and an HVAC air handler, and size of a first vent in the first room;
    determining a first volume of forced air of a fixed temperature required to reach the first temperature target based on the first thermal inertia of the first room and the first current temperature;
    powering on the HVAC air handler;
    determining a second thermal inertia and second current temperature of a second room;
    determining the second thermal inertia as a function of time of day, season, distance between the second room and the HVAC air handler, and size of a second vent in the second room;
    receiving a second temperature target for the second room;
    determining a second volume of forced air required to reach the second temperature target based on the second thermal inertia and second current temperature;
    adding the second volume to the first volume:
    opening the first vent in the first room;
    opening the second vent in the second room;
    closing the first vent in the first room once the volume of forced air required to reach the first temperature target is blown into the first room;
    sensing, with an acoustic sensor, a whistling sound as the first volume flows through the first vent or the second volume flows through the second vent; and adjusting louvers of the first vent or the second vent in response to the sensing.

8. A gateway, comprising:

one or more processors; and one or more computer-readable mediums storing instructions that, when executed by the one or more computer processors, cause the gateway to perform operations comprising:

receiving a first temperature target for a first room;

determining a first current temperature of the first room;

determining the first thermal inertia of the first room as a function of time of day, season, distance between the first room and an HVAC air handler, and size of a first vent in the first room;

determining a first volume of forced air of a fixed temperature required to reach the first temperature target based on the first thermal inertia of the first room and the first current temperature;

powering on the HVAC air handler;

determining a second thermal inertia and second current temperature of a second room;

determining the second thermal inertia as a function of time of day, season, distance between the second room and the HVAC air handler, and size of a second vent in the second room;

receiving a second temperature target for the second room;

determining a second volume of forced air required to reach the second temperature target based on the second thermal inertia and second current temperature;

adding the second volume to the first volume;

opening the first vent in the first room;

opening the second vent in the second room;

closing the first vent in the first room once the volume of forced air required to reach the first temperature target is blown into the first room;

sensing, with an acoustic sensor, a whistling sound as the first volume flows through the first vent or the second volume flows through the second vent; and adjusting louvers of the first vent or the second vent in response to the sensing.

9. The gateway of claim 8, wherein the first and second temperature targets are different.

10. The gateway of claim 8, wherein the HVAC air handler includes a multi-speed blower and the powering on the HVAC air handler sets the blower to a lowest speed setting.

11. The gateway of claim 8, wherein the HVAC air handler comprises a blower and the operations further comprise setting a blower speed of the blower to a level determined to minimize energy consumption.

12. The gateway of claim 8, wherein the HVAC air handler comprises a blower and the operations further comprise setting a blower speed of the blower to a level determined to minimize a time it takes to reach a desired room temperature.

13. The gateway of claim 8, wherein the operations further comprise determining if the first room is unoccupied and closing the first vent in the first room if the first room is unoccupied.

14. The gateway of claim 8, wherein the HVAC air handler comprises a blower and the operations further comprise setting a blower speed of the blower to a level determined to minimize energy consumption or time it takes to reach the first temperature target or to optimize both parameters.

* * * * *